Figure 1:
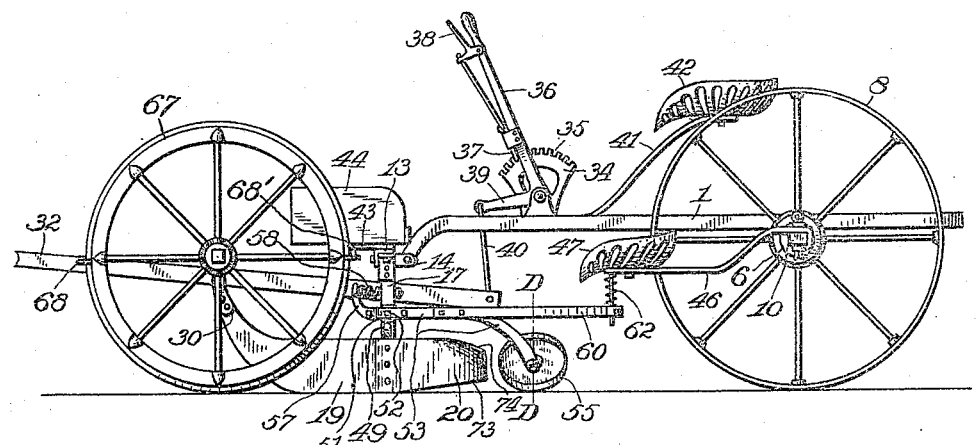

W. J. & R. H. RHOADES.
PLANT SETTER.
APPLICATION FILED MAY 13, 1909.

934,095.

Patented Sept. 14, 1909.

3 SHEETS—SHEET 1.

WITNESSES:
J. H. Gardner
K. R. Woddell

INVENTORS:
William J. Rhoades,
Robert H. Rhoades,
BY
E. F. Silvius,
ATTORNEY.

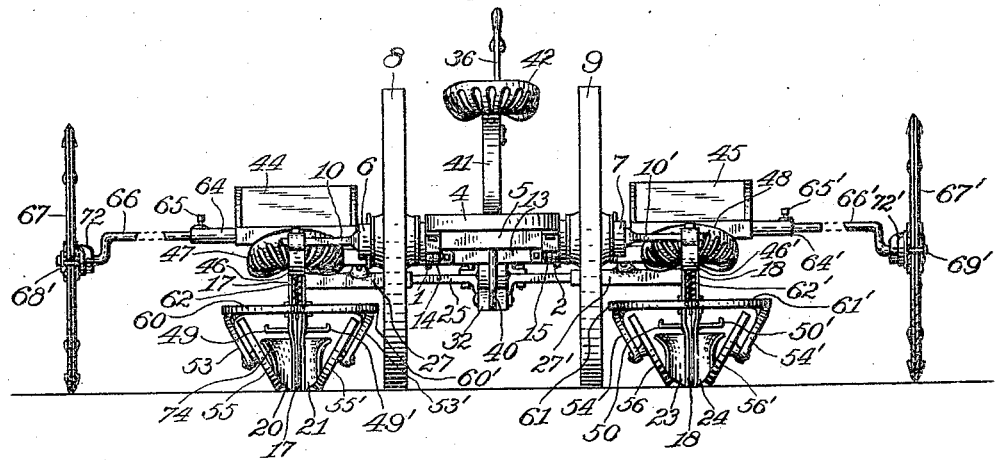
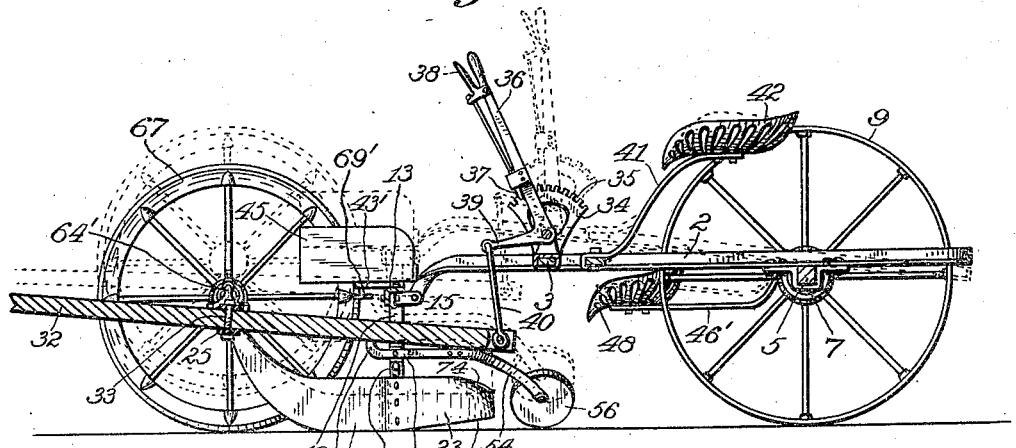
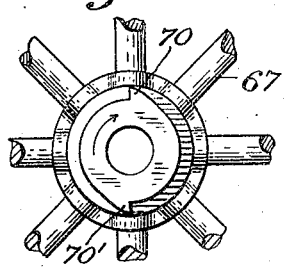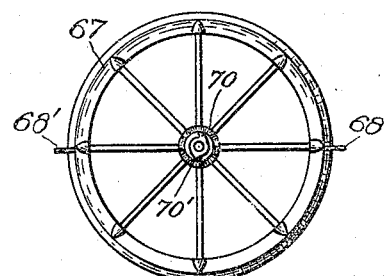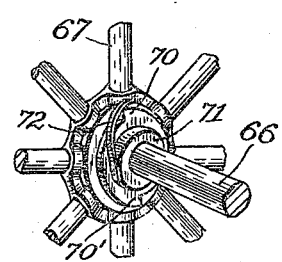

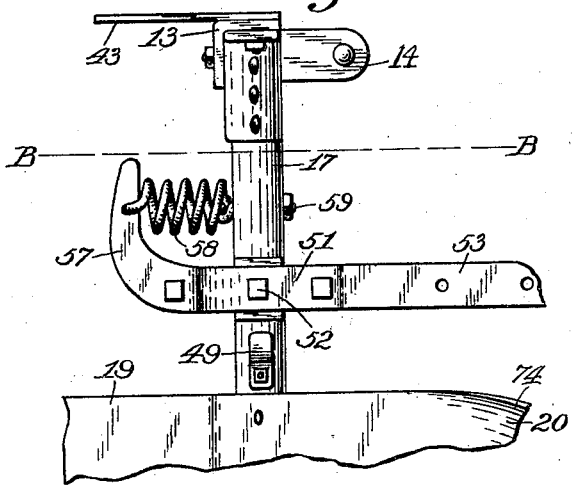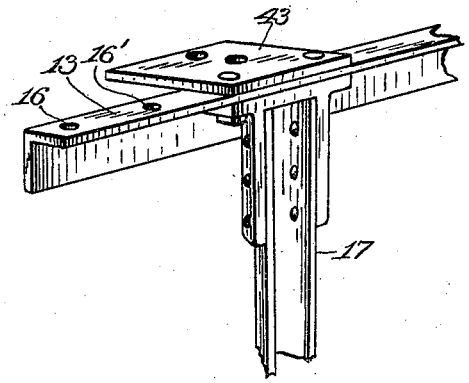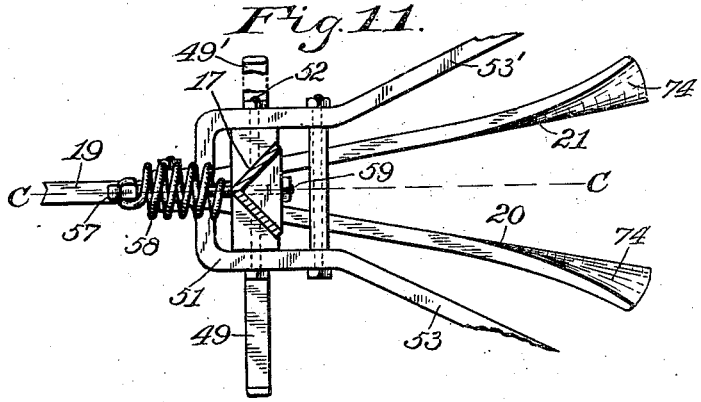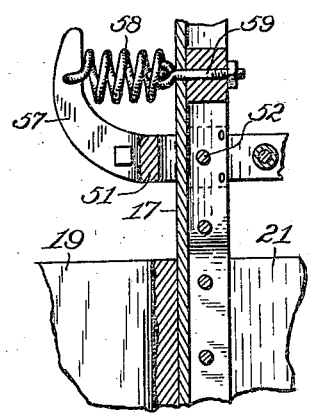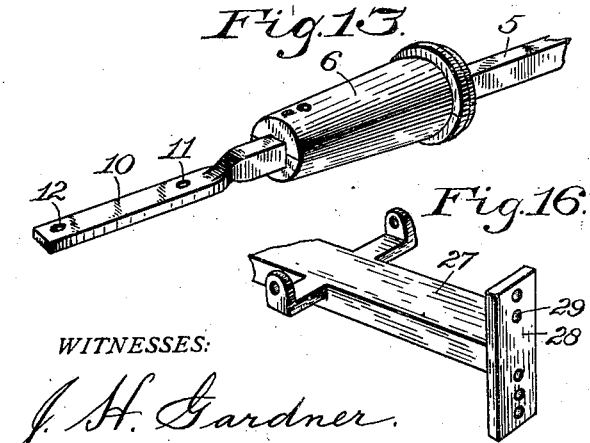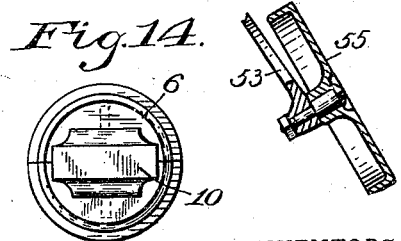

UNITED STATES PATENT OFFICE.

WILLIAM J. RHOADES AND ROBERT H. RHOADES, OF WHITE RIVER TOWNSHIP, JOHNSON COUNTY, INDIANA.

PLANT-SETTER.

934,095.              Specification of Letters Patent.     Patented Sept. 14, 1909.

Application filed May 13, 1909. Serial No. 495,678.

*To all whom it may concern:*

Be it known that we, WILLIAM J. RHOADES and ROBERT H. RHOADES, citizens of the United States, residing in White River township, in the county of Johnson and State of Indiana, have invented certain new and useful Improvements in Plant-Setters; and we do declare the following to be a full, clear, and exact description of the invention, reference being had to the accompanying drawings, and to the letters and figures of reference marked thereon, which form a part of this specification.

This invention relates to machines that are designed to be used in the operations of transplanting vegetables or shrubbery, the invention having reference particularly to a machine that is adapted to be used in operations of setting delicate or frail plants such as tomatoes, cabbage, or ornamental flowering plants, without injury thereto.

The object of the invention is to provide means whereby plants in large numbers may be set in regular order in fields, expeditiously and in careful manner, by the use of manual labor, and so that the plants will not be exposed to injurious effects through contact with machinery.

With the above-mentioned and minor objects in view the invention consists in an improved plant-setter comprising one or more channel cutters, a tray for carrying the plants, a pair of channel closers for closing the channel after the plants are manually set therein, a seat for supporting an operator conveniently near the tray and the channel cutter, and a line marker for making lines parallel to the channels for the guidance of the operator, all constituting a machine adapted to be drawn by animals or other suitable power.

The invention consists further in the novel parts, and in the combinations and arrangements of parts, as hereinafter particularly described and then pointed out in the accompanying claims.

Figure 2:
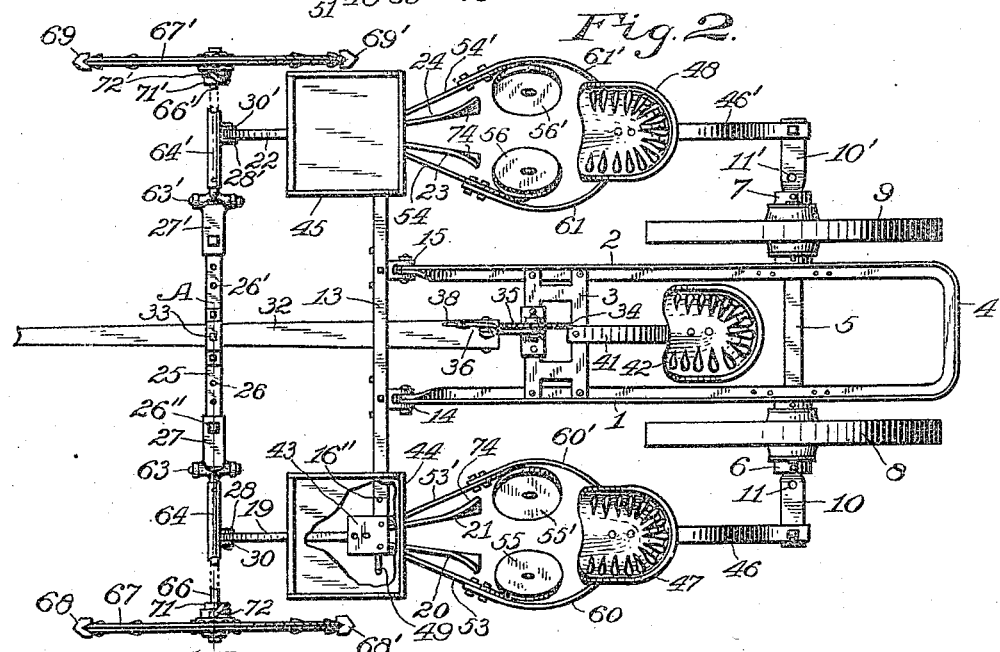
Figure 3:
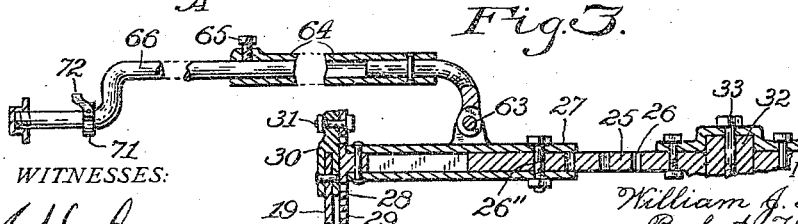

Referring to the drawings, Figure 1 is a side elevation of the improved plant-setter with the pole thereof broken away; Fig. 2, a top plan thereof; Fig. 3, a fragmentary vertical section on the line A A in Fig. 2; Fig. 4, a rear elevation of the machine; Fig. 5, a longitudinal vertical central sectional view of the machine; Fig. 6, a fragmentary elevation of the inner side of one of the marking wheels; Fig. 7, an elevation of one of the marking wheels complete; Fig. 8, a fragmentary perspective view of one of the marking wheels on its axle and provided with means for detecting inaccuracies that might occur in check row marking; Fig. 9, a fragmentary elevation showing connected portions of the machine; Fig. 10, a fragmentary perspective view showing portions of the machine frame; Fig. 11, a fragmentary sectional plan on the line B B in Fig. 9; Fig. 12, a fragmentary vertical sectional view on the line C C in Fig. 11; Fig. 13, a fragmentary perspective view of the main axle of the machine; Fig. 14, an end view of the axle; Fig. 15, a sectional view of one of the channel closing rollers; and Fig. 16, a fragmentary perspective view of a part of the main frame.

Similar reference characters throughout the drawings indicate corresponding elements or features of construction referred to herein.

In the drawings the invention is represented as adapted for setting two rows of plants at one time, being of convenient capacity for economical operation; and referring specifically to the construction of the machine, the main frame thereof comprises a part which preferably consists of two longitudinal members 1 and 2 having a platform member 3 rigidly secured thereto, a tail-bar 4 being connected to the rear ends of the members 1 and 2 and preferably formed integrally therewith. An axle-bar 5 is secured rigidly to the members 1 and 2 and forms a part of the main frame, the axle-bar having two wheel bearings 6 and 7 thereon adjacent to the outer sides of the frame-members 1 and 2, a pair of carrying wheels 8 and 9 being mounted rotatably on the wheel bearings. The axle-bar extends outward beyond the wheel bearings and forms frame members 10 and 10' in which are a suitable number of bolt holes as 11, 11', 12, spaced at suitable distances apart in each extension. The frame part is relatively narrow and the carrying wheels are spaced at a suitable distance apart so that both of the carrying wheels may travel between two rows of plants spaced at desirable distances apart for advantageous cultivation, and the axle extensions 10 and 10' are adapted to conveniently support seats for the operators who place the plants in the channels cut in the ground.

A transverse frame member 13 is provided with a pair of hinge members 14 and 15 which are hingedly connected to the forward ends of the members 1 and 2, the member 13 having a suitable number of bolt holes as 16, 16′, 16′′, in the end portions thereof, said member 13 having two vertical members 17 and 18 secured to the end portions thereof and extending downward, the members 17 and 18 being suitably bolted adjustably to the member 13 by the use of bolts that may be inserted into any of said bolt holes, so that said upright members 17 and 18 may be spaced at various distances apart for determining the distances apart that the rows of plants are to be spaced.

A channel cutter, which is runner shaped, so as to form a cutting blade 19, has two diverging blades or mold boards 20 and 21 formed thereon and is secured to the upright member 17, and a similar channel cutter comprising a blade 22 and diverging blades or mold boards 23 and 24 is secured to the upright member 18, the diverging blades extending rearward from the upright members so as to spread the earth at both sides of channels cut by the blades 19 and 22, said divergent blades being relatively long in order to prevent the earth from falling back into the channel while plants are being set in the space between the pairs of the diverging blades.

A forward transverse frame member 25 has a suitable number of bolt holes 26, 26′, in the end portions thereof to receive bolts 26′′, and a pair of frame members 27 and 27′ are secured adjustably to the end portions of the member 25 by said bolts, so as to render the member 25 extensible or contractible; each end member 27 and 27′ having a vertical plate 28 or 28′ thereon in which are pivot holes 29. The forward ends of the blades 19 and 22 are connected adjustably to the plates 28 and 28′ preferably by means of pivot plates 30 or 30′ and pivot bolts 31, so that the member 25 may be raised or lowered with respect to the channel cutters. A pole 32 is secured rigidly to the member 25 by a bolt 33 so that the machine may be guided by means of the pole, and obviously the draft animals or a power machine may support the forward end of the pole at a suitable distance from the ground, in the usual manner, and may be hitched in any desired manner to any suitable portion of the machine.

A quadrant 34 is mounted rigidly on the platform member 3 and has notches 35 therein, a lever 36 being pivoted substantially on the platform member and having a latch 37 to enter either one of the notches, the latch being withdrawn by the handle 38, as is usual, and the lever having an arm 39 to which is connected a link 40 that is connected to the rear end of the pole 32, so that when the lever is drawn rearward pivotally the rear end of the pole will be drawn up toward the plane of the members 1 and 2, and the forward end of the pole being assumed to be supported, the channel cutters will be elevated with respect to the ground, and obviously the channel cutters may be lowered by moving the lever forward, the construction and operation being similar to that employed in corn planters and well known.

A spring 41 is mounted on the platform member 3 and supports a seat 42 for the use of the driver or adjuster of the machine.

Two trays for carrying the plants are suitably mounted on the end portions of the frame member 13, preferably by means of base plates 43 and 43′ bolted to the top of the member 13 and directly supporting two trays 44 and 45 respectively above the members 17 and 18, so as to be readjusted with the upright members on the member 13.

A pair of similar springs 46 and 46′ are mounted adjustably on the extensions 10 and 10′ of the axle and support two seats 47 and 48 respectively, for the use of boys or planters rearward of the trays.

The upright member 17 has a pair of foot rests 49 and 49′ attached to the opposite sides thereof for the use of the planter sitting on the seat 47, and the member 18 has two similar foot rests 50 and 50′ thereon for the use of the planter sitting on the seat 48.

A channel closer frame 51 is connected to the upright frame member 17 by a pivot bolt 52 and a similar frame 51′ is similarly pivoted to the upright frame member 18, the channel closer frames being connected to the upright frame members above the foot rests. The frame 51 comprises a pair of rearwardly diverging arms 53 and 53′ that extend downwardly, and the frame 51′ comprises two rearwardly diverging arms 54 and 54′ that extend downwardly. The arm 53 has a roller 55 mounted rotatably on its lower end, and the arm 53′ has a roller 55′ mounted thereon, the axis of the rollers being inclined so that the upper portions of the rollers will be farther apart than the lower portions that roll on the ground behind the blades 20 and 21, to press the earth back into the channels after the plants are placed in the channels. The arms 54 and 54′ have similar rollers 56 and 56′ mounted thereon to roll behind the blades 23 and 24 for likewise closing the channel to cover the roots of the plants. The frames 51 and 51′ have upturned forward ends 57 and 57′ respectively, to each of which a spring 58 is connected, one spring being connected to the upright member 17 by an eye-bolt 59, and the other spring similarly connected to the other member 18 for yieldingly forcing the channel closing rollers down on the earth.

Preferably a pair of arms 60 and 60' are attached to and form extensions of the arms 53 and 53' respectively and have their rear ends joined together, a pair of arm extensions 61 and 61' being attached to the arms 54 and 54' and having their rear ends joined together. The arms 60 and 60' support a spring 62 that partially supports the seat 47, and the arms 61 and 61' support a spring 62' that partially supports the seat 48, and when the seat is weighted by the attendant or planter the channel closing rollers will be forced yieldingly on the ground by means of his weight. In some cases, however, either the springs 58 or the springs 62 and 62' may be dispensed with.

The end extensions 27 and 27' of the frame member 25 are each provided with a pivot 63 or 63', an axle part 64 being connected to the extension 27 by means of its pivot, and an axle part 64' connected to the extension 27' by means of its pivot, the axle parts being hollow a suitable distance inward from their outer ends and provided with set-screws 65 and 65' respectively, which adjustably secure axle parts 66 and 66' in the axle parts 64 and 64'. The part 66 has a combined line marking and spacing wheel 67 mounted rotatably thereon and the part 66' has a similar wheel 67' mounted rotatably thereon; the wheel 67 having two marking blades 68 and 68' on its periphery and the wheel 67' having two similar blades 69 and 69' on its periphery. The wheels are of suitable diameter to enable the blades to make marks on the ground at suitable distances apart equal to the distances it may be desired to set the plants apart in rows. The axle parts 66 and 66' or either of them should be adjusted so that a line may be marked on the ground by one of the wheels to be used by the driver as a guide when recrossing the field, it being intended that the pole 32 shall be carried above the guide line. In order to enable the operators to know whether or not the machine is spacing accurately, so that the field may be cultivated cross-wise, it is preferable to employ both of the marking wheels so that on uneven or lumpy ground if one of the wheels spaces too closely, or farther apart than designed the other wheel may continue to space accurately and the discrepancy readily be detected and corrected. The marking wheels are preferably provided with click devices whereby the driver may readily detect when the wheels are not marking accurately or in unison. In the present construction the click-devices are intended also to indicate the times to place the plants in the channels without it being necessary that the planters watch the check row markings while occupied in setting the plants. A simple form of clicking apparatus comprises two projections 70 and 70' on the inner side of the hub of each marking wheel, the axles being provided with collars 71 and 71' at the inner sides of the hubs, and spring fingers 72 and 72' mounted on the collars with their free ends in engagement with the hubs to be forced outwardly by the projections and then spring inward against the hub after the projections are carried from under the fingers, so as to produce clicking sounds. The clicking apparatus may be arranged to produce the sounds at any desired points of revolution of the wheels.

In order to form the channels with sloping sides so as to be well adapted to receive small plants in accurate alinement, the rear ends of the diverging blades of the channel cutters are inclined as at 73, and the upper end portions of the blades are preferably flared as at 74, so as to prevent lumps from falling back into the channels and also to provide ample space for the hands of the attendants when setting the plants.

It will be seen from the foregoing that the rows of the plants may be at various distances apart, and if it be desired to space the plants in the rows at different distances it will be necessary to remove the marking wheels and replace them with other wheels having a different diameter, as will be obvious.

In practical use the machine will be drawn forward and the blades 19 and 22 will cut narrow channels in the ground which will be slightly widened by the diverging blades. Two persons, preferably boys, will occupy the seats 47 and 48 and place their feet on the foot rests provided for them. Supplies of plants will be carried on the trays to be removed a few at a time by the boys and carefully separated, and each boy with one hand will set the plants one at a time between diverging blades of the channel cutter when the marking wheels produce the clicking sounds, the arrangement being such that the plants when set will be in transverse lines through the marks made by the blades on the marking wheels. The channels will be closed by the following rollers while the tops of the plants are still held by the attendant. If the clicking sounds do not occur in unison the machine should be stopped and observations made to determine which wheel may have gained or lost time, which may be detected by sighting the markings made by the blades of the wheels, and then the wheel which may be in error may be turned slightly forward or backward on its axle, as may be required, and then the planting operations may proceed. Other operations and results thereof will be readily understood from the foregoing description of construction in detail.

Having thus described the invention, what is claimed as new, is—

1. A plant-setter including a pair of carrying-wheels, a pair of channel-cutters, a frame mounted in the carrying wheels and on the channel-cutters and having seats mounted thereon rearward of the channel cutters, channel-closers mounted on the frame rearward of the channel-cutters, and a pair of trays mounted on the frame above the channel-cutters.

2. A plant-setter including a pair of carrying-wheels, a pair of channel-cutters, two pairs of channel-closers, a frame supported by the carrying-wheels and the channel-cutters and partially by the channel-closers, a pair of trays mounted on the frame above the channel-cutters, a pair of seats mounted on the frame rearward of the channel-closers, and a line-marker mounted on the frame.

3. A plant-setter including a pair of carrying-wheels, a pair of channel-cutters, a frame mounted in the carrying-wheels and on the channel-cutters, a pair of trays mounted on the frame above the channel-cutters, two pairs of channel-closers mounted on the frame rearward of the channel-cutters, a pair of seats mounted on the frame rearward of the channel-closers, two axles mounted on the frame and each having click-devices thereon, and two combined line-marking and spacing wheels, one on each axle, and having click-devices thereon to coöperate with the click-devices on the axles.

4. A plant-setter including two carrying-wheels, two channel-cutters, a frame mounted on the channel-cutters and comprising an axle that extends through the carrying-wheels, the carrying-wheels being spaced on the axle between the vertical planes of the two channel-cutters, a pair of trays mounted on the frame above the channel-cutters, two pairs of channel-closers mounted on the frame rearward of the channel-cutters, and two seats mounted on the end portions of the axles beyond the outer sides of the carrying-wheels and rearward of the trays and the channel-closers.

5. A plant-setter including a pair of carrying wheels, a pair of channel-cutters, a main frame mounted in the carrying-wheels and on the channel-cutters, two channel-closer frames pivoted to the main frame above the channel-cutters and having each a pair of channel-closing rollers mounted thereon and having also extensions thereon, a pair of seats mounted on the main frame and above the extensions of the channel-closer frames, springs seated on the extensions and partially supporting the seats for depressing the rollers by weighting the seats, a pair of trays mounted on the main frame, and a line-marker mounted on the main frame.

6. A plant-setter including a pair of carrying wheels, a pair of channel-cutters comprising each a blade having two diverging mold-boards thereon, the bottoms of the mold-boards being inclined at their end portions and the upper end portions of the mold-boards flaring outward, a main frame mounted in the carrying-wheels and on the channel-cutters and having two pairs of foot-rests thereon above the channel-cutters, a pair of channel-closer frames pivoted to the main frame above the foot-rests, channel-closing rollers mounted on the channel-closer frames near the ends of the mold-boards, springs connected with the main frame and the channel-closer frames to depress the rollers, and seats mounted on the main frame rearward of the mold-boards.

7. A plant-setter including a pair of carrying-wheels, a pair of channel-cutters, an axle mounted in the carrying-wheels, a longitudinal frame part secured to the axle, a quadrant attached to the frame part, a lever pivoted on the frame part, a latch on the lever to engage the quadrant, a transverse frame part attached to the channel-cutters and hinged to the longitudinal frame part, a pair of channel-closer frames connected to the transverse frame part, channel-closing rollers mounted on the channel-closer frames, a pair of seats mounted on the axle rearward of the channel-cutters, a forward transverse frame member connected with the channel-cutters, a pole secured to the forward transverse frame member, a link connected to the lever and also to the pole, a pair of axles pivoted to the forward transverse frame member, and combined line-marking and spacing wheels mounted on the pivoted axles.

In testimony whereof, we affix our signatures in presence of two witnesses.

WILLIAM J. RHOADES.
ROBERT H. RHOADES.

Witnesses:
  FRED TINGLE,
  MARK H. MYERS.